United States Patent [19]

Evans et al.

[11] 3,732,557
[45] May 8, 1973

[54] INCREMENTAL POSITION-INDICATING SYSTEM

[75] Inventors: David C. Evans; Ivan E. Sutherland, both of Salt Lake City, Utah

[73] Assignee: Evans & Sutherland Computer Corporation, Salt Lake City, Utah

[22] Filed: May 3, 1971

[21] Appl. No.: 139,434

[52] U.S. Cl...............340/324 R, 178/19, 179/2 DP, 235/151.32, 340/166 R, 340/324 M, 340/365 C
[51] Int. Cl...........................................G08b 5/36
[58] Field of Search..................178/19, 18; 235/151.32; 340/166 R, 324 R, 365 L, 365 C

[56] References Cited

UNITED STATES PATENTS

| 3,342,935 | 9/1967 | Leifer et al............................178/19 |
| 3,530,241 | 9/1970 | Ellis........................................178/19 |
| 3,440,643 | 4/1969 | Teager..........................340/166 R X |

*Primary Examiner*—David L. Trafton
*Attorney*—Nilsson, Robbins, Wills & Berliner

[57] ABSTRACT

A system for digitally manifesting the position of a probe with reference to aligned sets of conductors. Orthogonally arranged sets of index conductors in a tablet, and circular structures with parallel sets of conductors are shown for shaft-position encoder applications. Individual conductors in space-related, aligned, repeating sets are separately energized by phase-displaced signals which are proximity sensed to provide a phase-modulated signal that is digitally detected to manifest relative displacement. Incremental information may be supplemented by absolute position information, and the representative phase-modulated signals may be transmitted over long-distance communication links.

9 Claims, 10 Drawing Figures

PATENTED MAY 8 1973
3,732,557
SHEET 1 OF 3
Fig. 1.
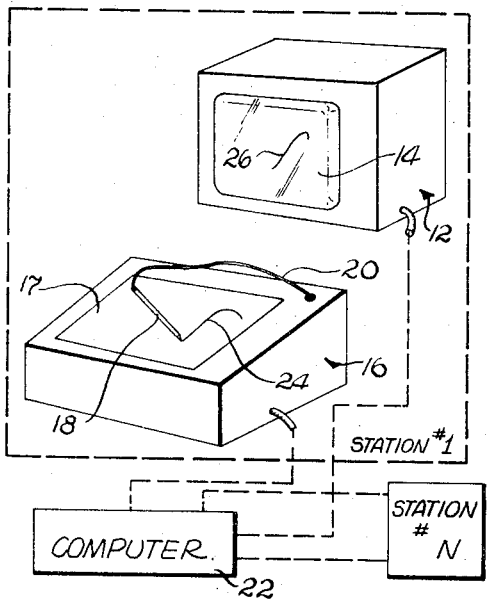
Fig. 2.
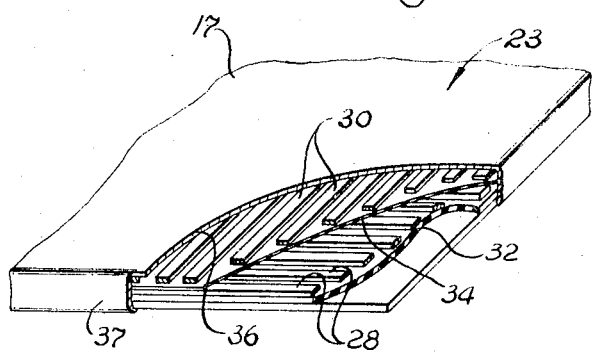
Fig. 4.
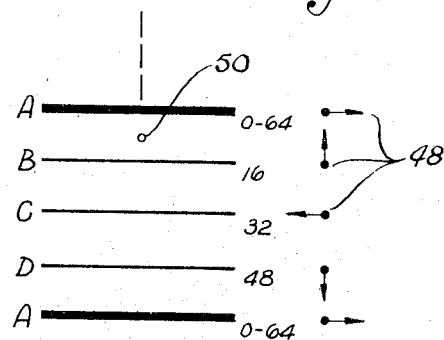
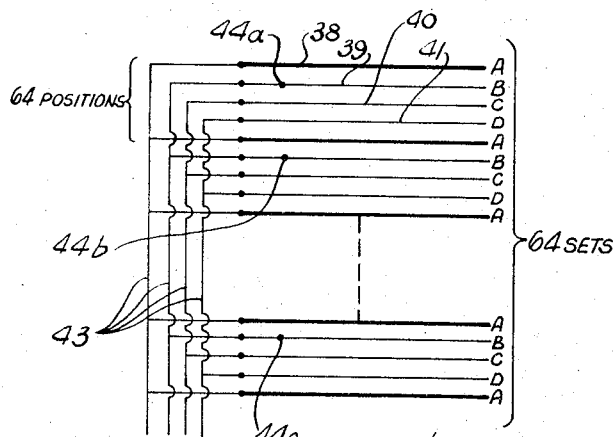
Fig. 3.
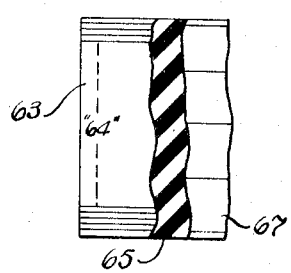
Fig. 4a.
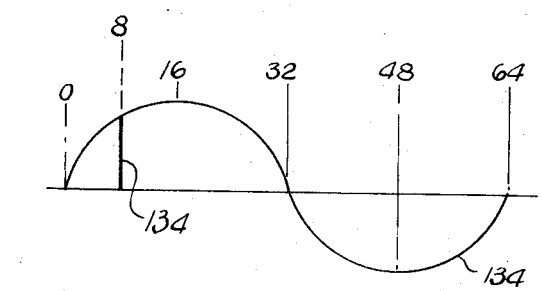
Fig. 7.
INVENTORS
DAVID C. EVANS
BY IVAN E. SUTHERLAND
Nilsson, Robbins, Wills & Berliner
Attorneys INVENTORS
DAVID C. EVANS.
BY  IVAN E. SUTHERLAND
Nilsson, Robbins, Wills & Berliner
Attorneys

INCREMENTAL POSITION-INDICATING SYSTEM

BACKGROUND AND SUMMARY OF THE INVENTION

The need frequently arises for a system to provide digital signals representative of absolute physical position and/or relative physical motion patterns. For example, graphic input devices have been proposed which utilize a pen-like stylus that is used in conjunction with a tablet to provide electrical signals indicating the relative position between the two elements. Generally in such devices, the point of engagement between the stylus and the tablet is resolved into signals that represent X and Y coordinates which indicate the position of the stylus. One form of such a device is disclosed in U. S. Pat. No. 3,399,401 issued Aug. 27, 1968, and entitled DIGITAL COMPUTER AND GRAPHIC INPUT SYSTEM.

In general, systems of the type under consideration enable substantially any graphic presentation, e.g., a hand-written signature, to be reduced to representative digital signals. Such signals may then be recorded, transmitted, computer processed or otherwise utilized, as to reproduce a facsimile of the original graphic presentation. In one aspect, applicants' system is founded upon a discovery that in one form, systems of the type under consideration need not indicate the absolute position of the stylus or probe; however, rather are operable incrementally to provide satisfactory digital signals to indicate graphic material in terms of movement. In another form, absolute position information is available periodically.

Generally, some forms of prior digitizing tablet structures have utilized a relatively high-frequency switching element and have employed signal frequencies that are not capable of reliable transmission over conventional telephone lines. Consequently, such systems have not only been relatively complex, but their use for remote installations has been somewhat limited. On the contrary, embodiments of the present system may utilize electrical signals that can be transmitted over conventional telephone lines with the result that central equipment may be shared by several remote digitizing and display devices.

The present system includes repeating sets of individual conductors which are disposed along at least one displacement path along which distance is to be indicated. The conductors in each set are energized with signals of a similar frequency; however, such signals are phase offset to encompass a full cycle. A probe, positioned contiguous to the conductors, senses a single signal, the phase of which indicates the position of the probe within one set of the conductors; however, the signal does not specify a particular set. Displacement of the probe then results in phase changes in the sensed signal which are digitized to manifest displacement as a motion pattern. Different groupings of conductors may be employed for course and fine position information, and for absolute position information, if desired.

BRIEF DESCRIPTION OF THE DRAWINGS

In the drawings, which constitute a part of this specification, exemplary embodiments demonstrating various objectives and features hereof are set forth as follows:

FIG. 1 is a perspective and diagrammatic view of a system embodying the present invention;

FIG. 2 is a sectioned perspective view of an element of the system of FIG. 1;

FIG. 3 is a diagram illustrative of the detailed structure as shown in FIG. 2;

FIGS. 4 and 4a are graphic and structural presentations illustrative of the system hereof;

FIG. 7 is a diagram illustrative of the operation of the system of FIG. 5;

DESCRIPTION OF THE ILLUSTRATIVE EMBODIMENTS

Figure 5:
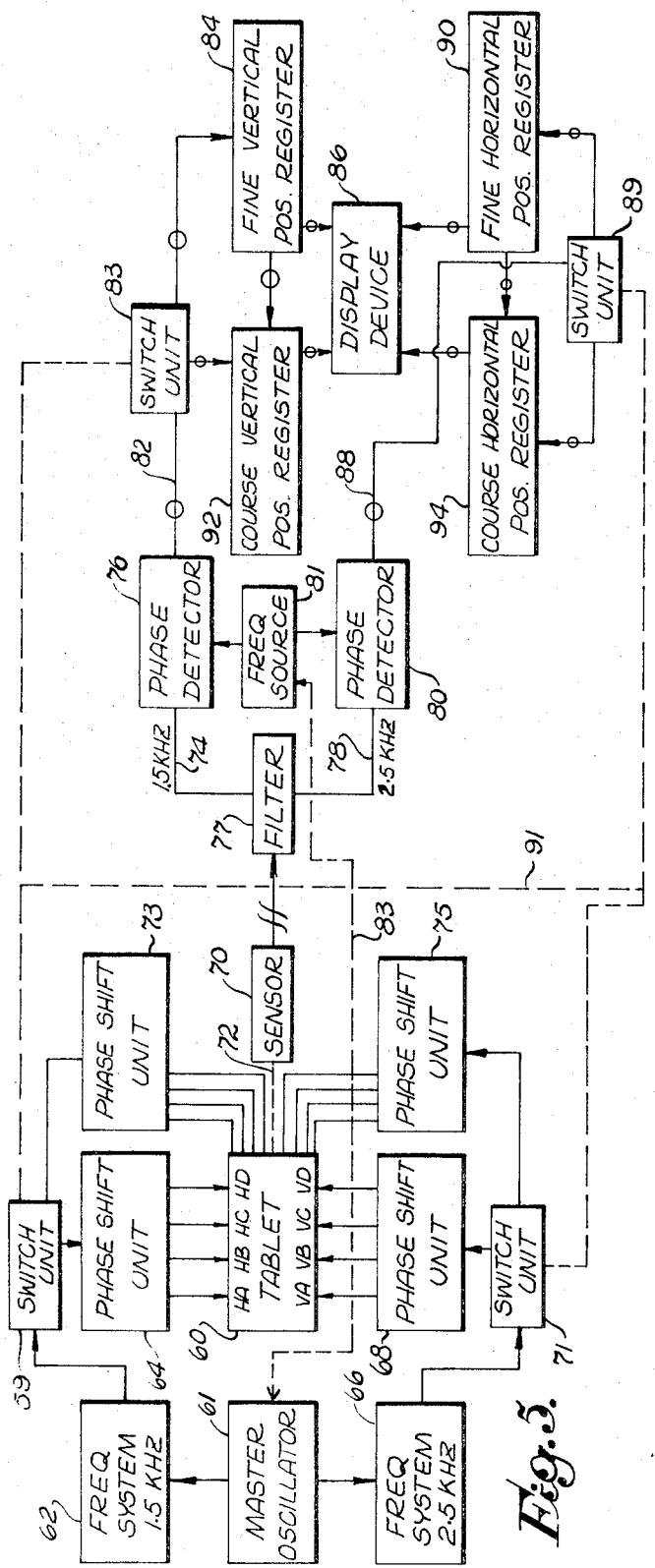
FIG. 5 is a block diagram of the system of FIG. 1.

Referring initially to FIG. 1, a unit 12 (housing a display face 14) is shown along with a graphic-input tablet unit 16. The tablet 16 includes a marking surface 17 for a pen or a probe 18 as indicated. The probe 18 is electrically connected through a cable 20 to the system that is housed in the unit 16 (described in detail below). The units 12 and 16, as indicated comprise a station No. 1 which is one of a similar plurality (to station No. N) that are coupled to a computer 22. As disclosed herein, the computer 22 may flexibly intercouple the units at different stations or alternatively may process digital information received in accordance with a wide variety of techniques as well known in the art.

In the operation of a station, the probe 18 may be manually used as a pen or pencil to provide a graphic representation 24 on the surface 17. As a consequence of the motion by the probe 18 contiguous to the surface 17, representative signals are provided in the cable 20 and are transmitted to the computer 22, as depicted. It is noteworthy that conventional telephone lines may be utilized to accomplish such transmission.

As described in detail below, the signals developed from the probe 18 (capacitively coupled) are phase-detected to manifest the representation 24 in a digital-signal form. As disclosed herein, the sensed signals are developed for use, in an exemplary application, to control a cathode ray tube device incorporating the face 14 to present a visual display 26 of the representation 24 at any of the several stations.

The system hereof may provide signals representative of relative displacement from an initial reference point, as for example, the displacement of the probe 18 with reference to a point on the surface 17, or absolute position may be indicated. As described in detail below, the displacement may take other forms as well, as to manifest angular displacement of a rotary shaft. However, initially pursuing the structure of FIG. 1, the structural details of the tablet defining the surface 17 are shown in FIG. 2 and will now be considered.

The tablet 23 includes the marking surface 17 disposed over electrically insulated planar rows of orthogonally arranged conductors. Specifically, as shown in FIG. 2, the tablet 16 comprises a composite of several individual layers including horizontal parallel conductors 28 and vertical parallel conductors 30. The uniformly spaced, aligned horizontal conductors 28 are carried on an insulating base layer 32 and are separated from the vertical conductors by an insulating sheet 34.

The similar vertical conductors (on the sheet 34) are covered by an insulating sheet 36 which may comprise the marking surface 17 as an erasable medium, or various other media. Note that in some embodiments the sheet 36 may be eliminated as a marking surface because of the immediate appearance of images on the face 14.

The tablet 23 may be variously produced as by wire strands or by using printed-circuit techniques. A printed-circuit embodiment is disclosed as exemplary. The base layer 32 carrying the horizontal conductors 28 comprises one circuit board or card while the sheet 36 carrying the conductors 30 comprises another circuit board. The two boards may be affixed together with a very thin insulating sheet 34 therebetween, as by a frame 37, to comprise the tablet 16. It is also here noteworthy that the structure of the tablet involves interconnecting the individual conductors 28 and 30 in patterns to define specific sets. These marginal connections (described below) may be effectively accomplished as part of printed-circuit production techniques. It is to be noted that registration between the horizontal and vertical conductors is not necessary, as in certain prior units, so long as perpendicularity of the axes is maintained.

The connection of the planes of individual conductors 28 and 30 (in each plane) into sets may be similar and will now be considered with reference to FIG. 3. As shown, each adjacent group of four parallel conductors is identified as a set (four is merely illustrative). Specifically, the individual conductors 38, 39, 40 and 41 comprise the first set of the conductors, as shown in FIG. 3. The pattern of the sets recurs as indicated with the conductors designated individually as A, B, C and D. The conductors are of similar dimensions; however, the conductors A are represented by heavier lines to define the separate sets of conductors.

As indicated in FIG. 3, lines 43 connect all of the conductors A in one group, similarly, all of the conductors B, all of the conductors C and all of the conductors D. In one illustrative embodiment 64 sets of conductors are provided in a plane, and each set of conductors is capable of resolving 64 positions within the set as disclosed in detail below.

In considering the present system, it is to be appreciated that absolute tablet-referenced coordinate positions need not be provided in all embodiments hereof. On the contrary, the system may provide only information indicative of displacement from a reference location which is derived from relationships within the sets of conductors. That is, the output signals resulting from the displacement relationship of a stylus at points 44a, 44b and 44c would be identical. Displacement of the stylus from these points is reflected in the observed or sensed signal, manifest as phase changes. Movements which involve passing the sensor or stylus from one set of conductors to another, e.g., crossing a conductor A, are also sensed to account for larger increments of displacement. Thus, in moving a stylus from point 44a to point 44b, a cycle of phase change occurs, which could be tallied at the crossing of conductor A, for example. However, note that position is absolute within a set of conductors.

Considering the operation of the system hereof in greater detail, reference will now be made to FIG. 4, essentially showing a single set of representative conductors individually designated A, B, C and D. In the operation of the system, each conductor A is energized by a phase-reference signal of substantially-constant frequency, e.g., 1.5 KHz. Each conductor B receives a signal that is phase delayed by ninety degrees. A third phase-delayed signal is applied to each conductor C (delay of 180°) and each conductor D receives a signal delayed from the reference by 270°. Thus, the four conductors are energized in 90° phase-displaced relationship to span a cycle. The phase relationship of the signals is derived from: 360/number of conductors. Thus, for a set of four conductors, the phase offset is 360/4 or 90°. Accordingly, the phase relationship of the signals applied to the individual conductors is indicated by the arrows 48 (FIG. 4).

If, in the operation of the system, a capacitive probe is positioned immediately above the conductor A (FIG. 4) the probe will sense the reference signal of zero phase displacement. Positioning the probe above the conductor B results in sensing a signal of 90° phase displacement from reference, while similar placements of the probe over conductors C or D provide sensed signals that are phase displaced by 180° and 270°, respectively. Thus, the signals sensed in positions immediately above each of the conductors in the set are in phase quadrature relationship. When a probe is positioned above any one of the conductors, signals from the two adjacent conductors (on either side of the sensed conductor) are in phase opposition and, therefore, cancel.

Further consideration of the system, as somewhat-graphically represented in FIG. 4, will reveal that as a probe moves through a set of conductors, e.g., from a conductor A to the next conductor A, the sensed signal will undergo a continuous phase shift through 360°. For example, if the probe is positioned to sense a point 50 (FIG. 4) it will receive a combination of the energy from the conductors A and B. The two received signals are of similar frequency and are in phase quadrature. Accordingly, the additive combination of these signals results in a sensed signal which is of the reference frequency; however, which is offset from the reference phase by 45°.

Thus, as a probe is moved from a position immediately above a conductor A to a position immediately above a conductor B, a continuous phase change is sensed passing through a displacement of 90°. Similar displacement occurs in movement between the other conductors, with the result that the movement from one conductor A to another conductor A involves a continuous phase shift through 360°. In the disclosed system, a cycle of phase shift (360°) is divided into 64 digital increments, i.e., the system provides a resolution of one part in 64 within a set of conductors.

The capability of the system to resolve position within a set of conductors affords several possibilities. For example, the system may incorporate recurring sets of conductors, as depicted in FIG. 3, and operate solely to indicate movement of a probe in relation to the tablet. Alternately, a single set of conductors may be placed to evenly divide the length of the tablet, whereby absolute-position indicating signals are provided. This application stems from the fact that position-indicating signals are absolute within a set of conductors (covering one cycle of phase displacement). Another form of structure may utilize one set of conductors to coursely indicate the position in an absolute manner, with plural sets of conductors subsequently functioning to finely place the probe position. Such pyramiding may involve separate conductors or separate operating groups controlled by switches.

Referring to FIG. 4a, to consider a single direction, a plane 63 has 64 sets of conductors therein while a plane 67 has simply one set, e.g., five conductors. The two planes 63 and 67 are separated by a larger 65 of insulation. The conductors in the plane 67 may be energized by phase-displaced signals which may be sensed by a probe to absolutely identify the probe position with an accuracy of one part in 64. Thus, the conductors in the plane 67 may be energized to locate the probe within a specific one of the 64 sets of conductors in the plane 63. Thereafter, the conductors in the plane 63 may be energized to more-accurately locate the probe and account for motion thereof. Note that, rather than to provide separate planes, one plane may be employed with a selective connection arrangement.

Reference will now be made to FIG. 5 wherein a tablet unit (which may be as described above) is depicted as a block 60. The structure of the tablet 60 may be as depicted in FIG. 4a with the conductors in plane 63 connected as indicated by FIG. 3 in 64 sets, for example, to provide fine-position sets. The conductors in the plane 65, are for absolute positioning. Of course, as indicated above, both horizontal and vertical groups are provided.

The fine-position horizontal sets of conductors (each including conductors A, B, C and D, FIG. 4) are energized by signals HA, HB, HC and HD. Somewhat similarly, the individual conductors A, B, C and D in each set of fine-position vertical conductors are energized by signals VA, VB, VC and VD. The signals HA, HB, HC and HD may, for example, be of 1.5 KHz and are provided from a master oscillator 61 through a frequency system 62, a switch unit 59 and a phase shift unit 64 to develop the signals in phase quadrature. The signals VA, VB, VC and VD may be of 2.5 KHz and are provided from the master oscillator 61 through a frequency system 66, a switch circuit 71 and a phase shift unit 68 to accomplish phase quadrature relationship.

The course-position conductors of the tablet (vertical and horizontal) are also energized by the master oscillator 61. Specifically, the switch unit 59 selectively energizes either the fine-position sets of horizontal conductors through the phase shift unit 64, or alternatively energizes the single set of course conductors through a phase shift unit 73. Similarly, the switch unit 71 functions to selectively energize either the fine position sets of conductors through the phase shift unit 68 or the course position conductors through a phase shift unit 75. Thus, the tablet 60 has two operating states: (1) operation for absolute position, using the course conductors, and (2) operation for fine position indications and to account for motion. The two operations are individually selected by controlling the switch units 71 and 73, along with other switch units as described in detail below.

The tablet 60 is capacitively sensed by a sensor 70 as indicated by a dashed line 72. Specifically, the sensor 70 may comprise a pen-like structure as described above, incorporating means for capacitively (or otherwise) sensing energy from the individual conductors in the tablet 60. A variety of such structures are well known in the prior art.

During either operational state, the signal provided by the sensor 70 is a composite of the two different frequency signals, each of which is phase related to indicate physical displacement of the sensor within a set of conductors. That is, upon separation into frequency components (1.5 and 2.5 KHz), the composite signal manifests an X-component and a Y-component of displacement in the signal sets, by phase displacement from reference.

The signal from the sensor 70 is passed through a communication link (telephone line and/or multiplexer, for example) and applied to filter 77 for separation into the two frequency components. That is, the tablet 60 with the sensor 70 may be remotely located from the filter 77 (and related detecting structure). Furthermore, several remote units may time share a single central structure as by multiplex techniques as well known in the prior art.

From the filter 77 the lower frequency signal (1.5 KHz) is provided through a conductor 74 to a phase detector 76. Somewhat similarly, the higher-frequency signal (2.5 KHz) is provided through a conductor 78 to a phase detector 80. The phase detectors 76 and 80 may be of similar structure and are synchronized with the frequency systems 62 and 66, respectively, to provide phase-reference signals. Specifically, for example, the phase detectors 76 and 80 may receive reference signals from a frequency source 81 which is variously synchronized with the master oscillator 61 as indicated by a dashed line 83, in accordance with a variety of techniques as well known in the art. It is to be noted that other synchronizing techniques may be used as well known in the art.

The phase detectors 76 and 80 provide digital outputs that are indicative of the position and motion of the sensor 70 in relation to the tablet 60. Note that the observed displacements in relation to the horizontal sets of conductors are actually vertical, while observed displacements in relation to the vertical sets of conductors are horizontal.

The phase detector 76 is connected to provide output digital signals through a cable 82 and a switch unit 83 to either a fine register 84 or a course register 92. These registers are connected to the vertical deflection controls (not shown) of a display device 86. Somewhat similarly, the phase detector 80 is connected through a cable 88 and a switch unit 89 to supply signals to a fine register 90 and a course register 94 which are connected to the horizontal deflection controls (not shown) of the display device 86. The registers 84 and 90 contain digits of lesser significance than the registers 92 and 94. The deflection in the display device (as by a D/A converter) reflects the digital significance of individual register stages. The course position registers 92 and 94 are, in act, up/down counters which are set each time the system utilizes the course conductors to make a determination of absolute position. These registers are then incremented (or decremented) when the fine position registers 84 or 90 overflow or underflow. For example, if during operation, a fine position register contains a very large value that suddenly becomes a very small value, the course position register will be incremented as the probe is indicated to have moved from one fine set of conductors to another.

Prior to considering the detailed operation of the system as shown in FIG. 5, reference first will be made back to FIG. 1 for some further consideration of the manner in which the system represents relative motions. As shown in FIG. 1, the position of the display on the face 14 is somewhat coincident with the position of the representation 24 on the surface 17. However, such coincidence must be initially established. Subsequently, the operation of the system is incremental in that it detects and manifests movements. For example, if the probe 18 is lifted from the surface 17 and returned in the upper left corner, the switch units 59, 71, 83 and 89 must be actuated to cause a course-position sensing operation to re-establish the proper absolute position of the probe 18. Thereafter, the system manifests displacement from the new point. A movement of the probe 18 to a new position can be variously detected to actuate the switches 59, 71, 83 and 89. For example, in accordance with prior-art tablet systems, structure may be provided for distinguishing between "motion without writing" and "writing". Specifically, one prior art technique has involved the use of a switch (pressure-sensitive in some instances) so that "writing" occurs only when the switch is closed. Consequently, by incorporating such prior structure, in the probe 18, repositioning operation is actuated each time the probe 18 is returned to the marking surface of the tablet 60.

Considering the detailed operation of the system of FIG. 5, as the probe or sensor 70 is lowered into a sensing relationship with the tablet 60, it is actuated on initial contact to set the switch units 59, 71, 83 and 89 to actuate the phase units 73 and 75 with the course registers 92 and 94. Of course, various other controls may actuate the control switches, as a periodic time unit or other manual means as indicated by the dashed lines 91.

During the initial operation, the phase shift units 73 and 75 each energize a single set of conductors, spanning the entire surface of the tablet 60. The operation may be considered as providing a full cycle (360°) of phase displacement vertically and horizontally across the surface of the tablet 60.

The sensor 70 receives the two different-frequency signals (horizontal and vertical) which are separated by the filter 77. As the phase of each of these signals is indicative of the absolute position along one axis (X or Y) of the sensor 70, the outputs from the phase detectors 76 and 80 digitally provide such information. Specifically, as a single set of the course conductors span the tablet in either direction, the phase-displaced signals applied to the phase detectors 76 and 80 each indicate one of 64 absolute positions as described with reference to FIG. 4. The phase detectors 76 and 80 represent the positions by two six-bit binary numbers which are registered in the course registers 92 and 94 respectively.

With the absolute position of the sensor 70 registered in the registers 93 and 94, to designate a specific set of fine conductors (FIG. 3) the switching units 73, 75, 83 and 94 are set (manually or otherwise) to actuate the fine-position operation. Specifically, the switch units 59 and 71 now energize the phase units 64 and 68 respectively, while the switch units 83 and 89 couple the phase detectors 76 and 80 to the fine registers 84 and 90 respectively.

As during the operation to establish the absolute position in one of the 64 conductor sets (by registering six-bit binary values in the registers 92 and 94) the sensor 70 senses the composite of two signals (1.5 KHz and 2.5 KHz) each of the phases of which are indicative of one of 64 positions within a set of conductors (FIGS. 3 and 4).

In processing, as indicated above, the composite signal from the sensor 70 again is first separated into its two frequency components by the filter 72 then is phase detected to provide the positional relationship within a set of fine conductors as a digital indication which is registered as a vertical indication in the register 84 and as a horizontal indication in the register 90. Note that a specific form of the digital phase detectors 76 and 80 as incorporated herein is disclosed below with reference to FIG. 6.

After initial placement of the sensor 70 on the tablet 60, the display device 86 manifests a point location determined by the combined contents of the registers 92 and 94 and the registers 84 and 90. Referring to FIG. 3, the contents of the course registers (registers 92 and 94) designate one of 64 sets of conductors (in each coordinate) in which a point is manifest. The contents of the registers 84 and 90 indicate one of 64 positions of the point (in each coordinate) within a set of conductors.

As the sensor 70 is moved, initially within a set of conductors, the contents of the registers 84 and 90 vary accordingly. Each time the sensor 70 crosses into a fresh set of conductors, the change is indicated by the registers 84 or 90 overflowing (or passing through zero) which event results in the application of a stepping pulse to the associated registers 92 and 94. For example, if the register 84 undergoes a change, either from 0 to 64 or from 64 to 0, a pulse is supplied, as indicated, to the register 92 indicating either a positive or a negative change to accordingly reflect the movement from one set of register stages to the next. Thus, the display system accounts for changes to indicate motion and absolute position.

Figure 6:
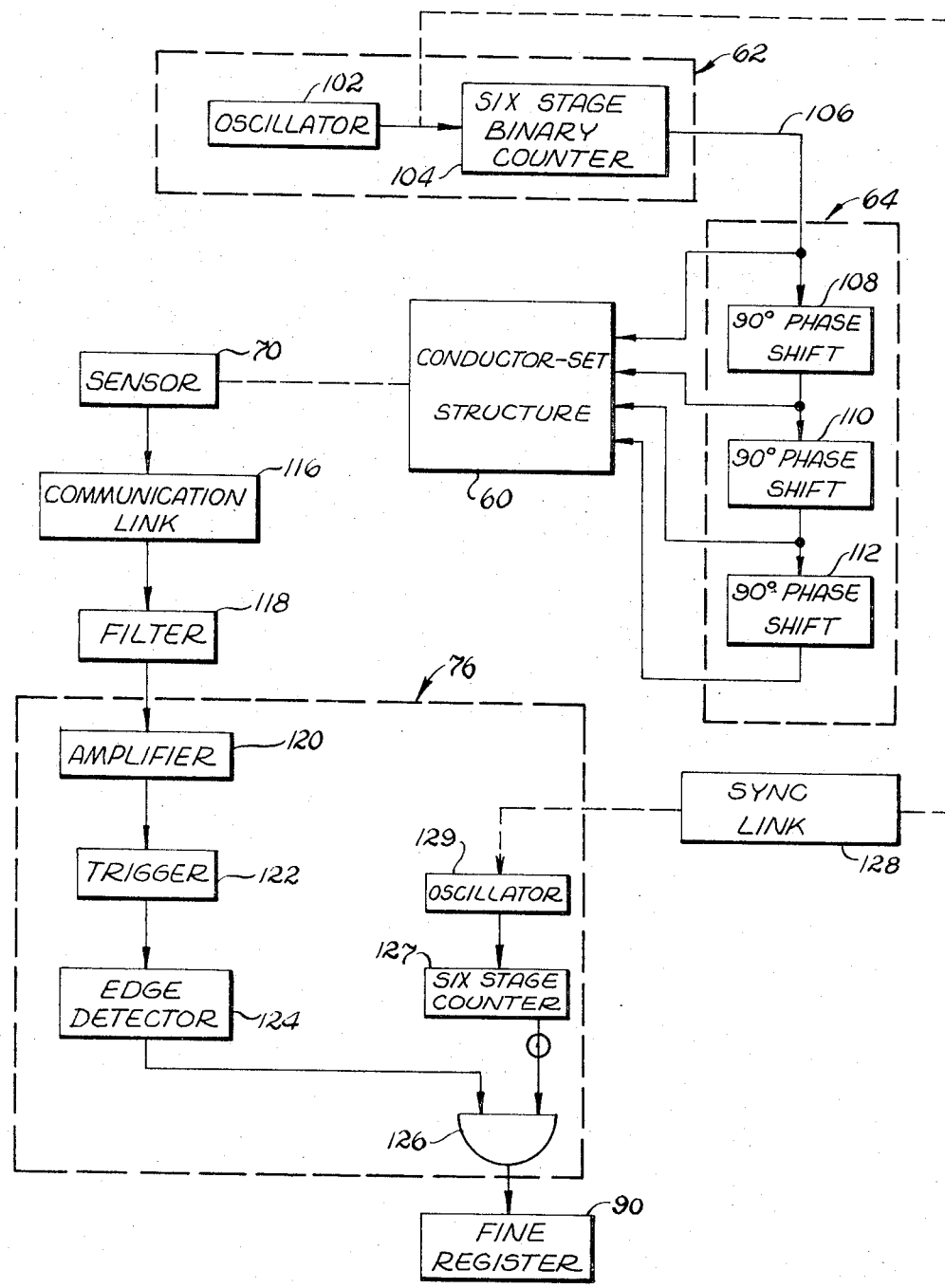
FIG. 6 is a detailed block diagram of a sub-system of the system of FIG. 5.

Considering the system of FIG. 5 is still greater detail, a portion thereof is shown in FIG. 6 which illustrates the vertical displacement fine-position channel. Of course, the horizontal displacement fine-position channel and the course position channels include similar elements. Generally, as indicated by dashed lines, the structure of FIG. 6 includes the frequency system 62, the tablet or equivalent structure 60, he phase shift unit 64, the sensor 70 and the phase detector 76, all as identified above.

The frequency system 62 includes a stable oscillator 102 connected to drive a binary counter 104 which in the preferred embodiment may comprise six binary stages to function as a divider. The oscillator 102 may have a frequency of some 96 KHz which frequency is divided by 64 in the counter 104 to provide an output to a line 106 of the basic frequency, e.g., 1.5 KHz.

The line 106 supplies the basic-frequency signal to the phase shift unit 64 which includes three delay circuits or phase shifters 108, 110 and 112 each of which accomplishes a 90° phase shift in the basic or reference frequency signal. The output from each of the phase shifters 108, 110 and 112 as well as the reference frequency signal are supplied to the structure 60 connected to individual conductors A, B, C and D, respectively, in each set as described in detail above.

The tablet structure 60 is sensed as described above by the movable sensor 70 to provide a phase related or phase modulated signal, again as described in detail above. The output from the sensor 114 is supplied through a communication link 116 which may comprise simply an amplifier or a long-distance communication line. The output received through the link 116 is filtered to derive the basic frequency signal (filter 118) which is applied to the phase detector 76.

The phase detector 76 includes an amplifier 120 which drives a trigger circuit 122 the output of which is differentiated by an edge detector 124 and supplied to a gang "and" gate 126. The single-polarity output pulses from the detector 124 qualify the gate 126 to provide the contents from a binary counter 127 to the register 90. The counter 127 is driven by an oscillator 129 that may be variously synchronized with the oscillator 102. Specifically, for example, a synchronizing link 128 in various forms may be provided as indicated.

In the operation of the system as shown in FIG. 6, the contents of the counter 127 is repeatedly supplied to the register 90 at an instant in the counting sequence which is indicative of the phase displacement of the sensed signal. Consequently, the position of the sensor 70 in relation to a set of conductors in the structure 60 is manifest. Each cycle of the reference frequency involves a count from 0 to 64 in the binary counters 104 and 127. The phase displacement of the signal sensed by the sensor 114 strobes the contents of the counters through the parallel gang "and" gate 126 into the register 90.

The operation of the system as shown in FIG. 6 is illustrated somewhat analytically in FIG. 7. A single cycle of the reference frequency signal 132 (conductor 106) includes a count from 0 to 64 by the counters 104 and 127. As explained above, depending upon the positional relationship of the sensor 70 within a specific set of conductors in the structure 60, a phase-displaced signal of the reference frequency is developed. That signal is processed to provide a single narrow pulse or edge 134 (FIG. 7) which is time-related to the reference signal whereby its displacement therein is indicative of numerical values between 0 and 64. As illustrated in FIG. 7, the occurrence of the spike 134 during the first portion of the first half cycle of the basic frequency indicates a value of eight as the relative displacement for the sensor 70 within a conductor set. Specifically, as described with reference to FIG. 4, such displacement is manifest to be between the first and second conductors in a set.

Changes in the positional relationship between the sensor 70 and the set of conductors in the structure 60 are manifest by phase changes to in turn change the contents of the register 90. Of course, overflows in either direction by the register 90 are tallied to account for a movement from one set of conductors to another. Accordingly, binary signals are provided representative of a motion pattern. Such an arrangement not only avoids considerable complexity in relation to prior systems but additionally avoids difficult alignment problems which are present in certain applications.

Figure 8:
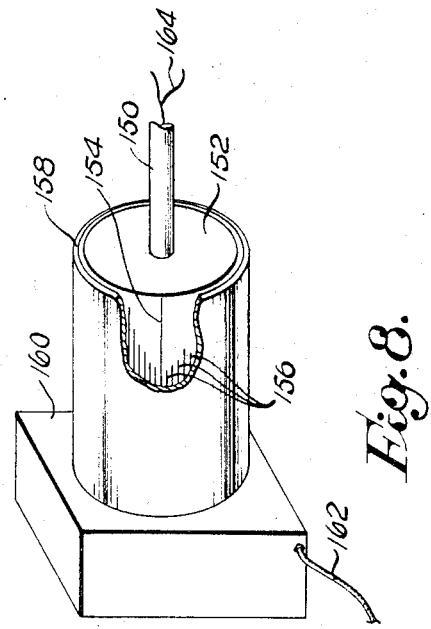
FIG. 8 is a perspective view of an alternate component for the system of FIG. 6.

As suggested above, the structure 60 and the sensor 70 may take a variety of different forms that are distinctly different from that depicted in the above-described figures. Specifically, the sensor 70 may comprise a rotary unit in combination with the structure 60 for sensing shaft displacement, one form of which is shown in FIG. 8. Specifically, a rotary shaft 150 is coaxially affixed to a drum 152 bearing a single axially-parallel conductor 154 affixed to the curved surface of the drum. The conductor 154 provides capacitive coupling with sets of conductors 156 which are affixed in parallel axially alignment to a cylinder 158 which telescopically receives the drum 152. The conductors 156 are organized in sets, as described above, and connected through a terminal structure 160 to be energized through a cable 162. Accordingly, depending upon the positional relationship of the conductor 154 within a set of conductors 156, an output signal is provided through a terminal conductor 164 which is phase displaced from the reference phase signal as described above. Thus, shaft displacement is effectively digitized by incorporating the sensing structure as shown in FIG. 8 as the sensor 114 and the structure 60 in the system of FIG. 6.

Figure 9:
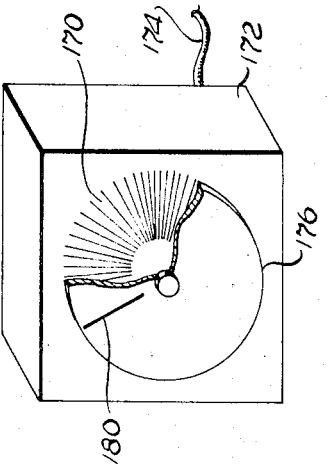
FIG. 9 is a perspective view of another alternate component of the system of FIG. 6.

In another rotary form of the sensing structure, a disk relationship may be employed as depicted in FIG. 9. Specifically, a pattern of radial conductors 170 is provided on a stationary unit 172. The individual sets of conductors 170 are energized as described above through a cable 174. A disk 176 is then provided in concentric alignment with the conductors 170 for providing the phase modulated signal. The disk 176 carries a conductor 180 for sensing the energy in the conductors 170 by capacitive coupling.

Thus, the system hereof may take a wide variety of different forms involving at least one set of index conductors which are disposed along a path of displacement which is to be indicated and which are utilized in cooperation with a probe or other sensing device to provide a phase-displaced information signal which may be phase detected to provide a representation digital output. Thus, it will be apparent to those skilled in the art that the system described herein may be embodied in a wide variety of different specific structures at wide variance from the details as disclosed. Accordingly, the claims as set forth below define the scope hereof.

What is claimed is:

1. A displacement-indicating system, comprising:
    at least one set of index conductors disposed in spaced relationship along a path of displacements to be indicated;
    means for defining at least first and second operating states for said system;
    means for providing a plurality of phase-offset electrical signals;
    means for coupling said phase-offset electrical signals to different sets of said index conductors during said first and second operating states;
    probe means for sensing a phase signal from said set of conductors;
    phase detection means for receiving said phase signal from said probe means to manifest said displacement of said probe in relation to said set of conductors;

register means for manifesting a positional relationship of said probe means to said index conductors; and means for coupling said phase detection means to differently actuate said register means during said first and second operating states, to provide coarse and fine position indications in said register means respectively during said first and second operating states.

2. A displacement-indicating system according to claim 1 wherein said register means comprises a digital register having a plurality of sections and wherein said sections are differently connected to said phase detection means during said first and second operating states.

3. A system according to claim 1 wherein said set of index conductors are provided in a circular pattern.

4. A system according to claim 1 wherein said set of index conductors are provided in a flat configuration and further including an insulating sheet covering said conductors.

5. A system according to claim 1 including two sets of conductors orthogonally arranged to indicate displacements along substantially perpendicular paths.

6. A system according to claim 5 wherein said means for providing a plurality of offset electrical signals comprises means for providing such signals of a first and a second frequency and wherein said means for coupling comprises means for coupling said signals of a first frequency to one set of conductors and said signals of a second frequency to another set of conductors and said system further including filter means for frequency distinguishing signals applied to said phase detection means.

7. A system according to claim 1 wherein said index conductors are embodied in a flat tablet comprising a base layer and a cover sheet with said index conductors in the form of printed-circuit layers disposed therebetween.

8. A system according to claim 1 wherein said means for defining comprises a plurality of switch means.

9. A system according to claim 1 further including a display device coupled to said register means for exhibiting displacement.

* * * * *